J. McGREW.
Improvement in Cider-Mills.

No. 131,453.

Patented Sep. 17, 1872.

Witnesses:
G. Mattrys.
Solon C. Kemon

Inventor:
John McGrew
Per Kemon & Co.
Attorneys.

UNITED STATES PATENT OFFICE.

JOHN McGREW, OF RAVENSWOOD, WEST VIRGINIA, ASSIGNOR TO HIMSELF AND MARGARET J. SMITH, OF SAME PLACE.

IMPROVEMENT IN CIDER-MILLS.

Specification forming part of Letters Patent No. 131,453, dated September 17, 1872.

*To all whom it may concern:*

Be it known that I, JOHN McGREW, of Ravenswood, in the county of Jackson and State of West Virginia, have invented a new Cider-Mill, of which the following is a specification:

The invention consists in forming a cider-mill, which crushes the apples and conveys them through an intermediate space between two pressing-rolls, where the juice is expressed, the pomace discharged, and the cider conducted into a suitable receptacle.

Figure 1:
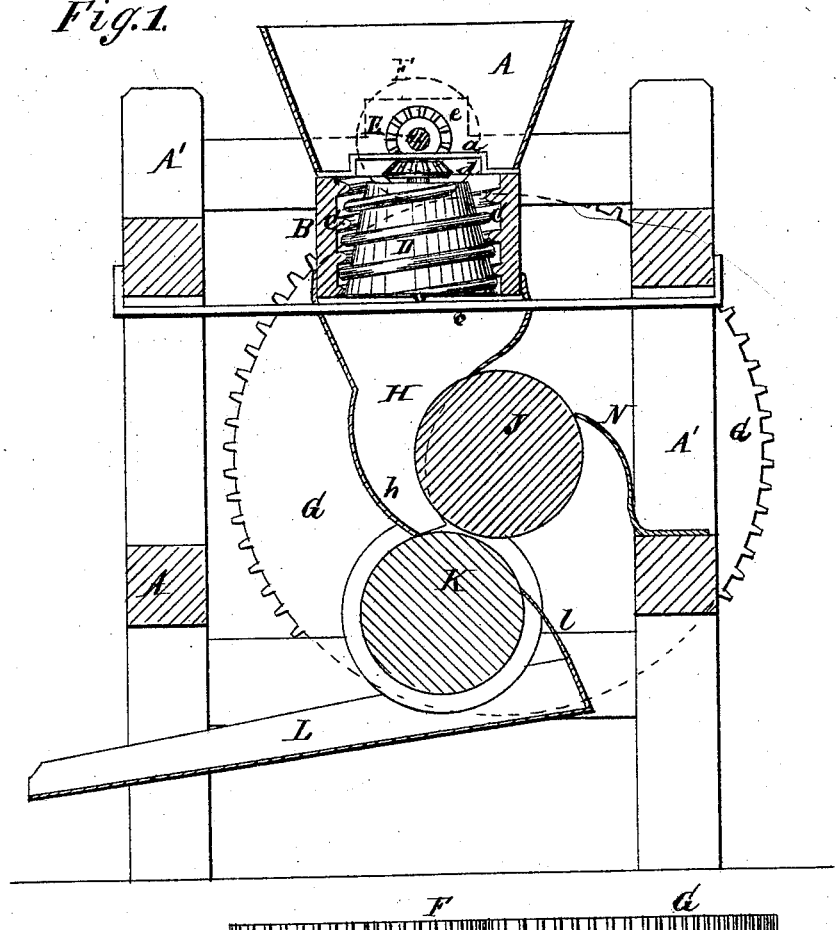
Figure 2:
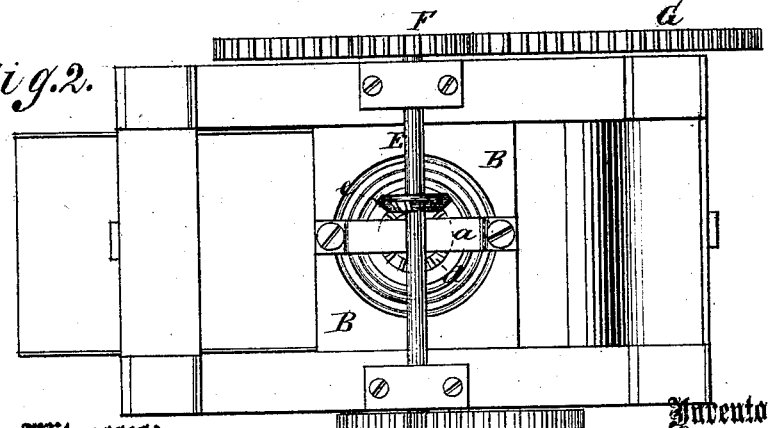

In the drawing, Figure 1 is a sectional elevation of my improved mill, and Fig. 2 a plan view.

A represents a hopper, and A' the frame of the machine, in the top of which and between its cross-bars is rigidly fixed a perforated block, B. Across the perforation a is placed a metal strap, and on the sides of said perforation is formed a spirally-threaded crusher, C. In the perforation is a corresponding rotary crusher, D, which is pivoted at bottom in strap c, and has a bevel-wheel, d, at the upper end that gears with bevel-wheel e of shaft E. This shaft has a pinion, F, that gears with large drive-wheel G. Beneath the crushers C D is located a hopper, H, in which the comminuted apples are received, guided through its curved channel h, and allowed to pass between the pressure-rolls J K. The lower roll K has an annular flange on each end, which overlaps the ends of top roll, and thereby prevents any escape at the side. L is the juice-spout, which extends beyond the rolls on each side, and has a rear flange, l, that comes near enough to the rear side of button-roll to turn the pomace from spout while all the juice flows into it. Suitable receptacles are placed to receive the juice and the pomace. M M are spur-wheels on end of pressure-shafts. N is cleaner or scraper for the roll J.

The operation is as follows: The large wheel G is turned by a crank or by any other suitable means. It operates pinion F that turns shaft E, and the bevel-wheels d c are thus made to turn the rotary crusher D and the two expressing-rolls J K. The apples feed between the vertical crushers, while the crushed apples are received into the middle hopper and conveyed to the squeezers or pressers. Here the juice is expressed and caused to flow into the spout, while the refuse is discharged in the rear of the rolls.

Having thus described my invention, what I claim as new, and desire to secure by Letters Patent, is—

The vertical crushers and horizontal pressing-rolls, combined with the intermediate hopper H having the channel h, arranged as and for the purpose described.

JOHN McGREW.

Witnesses:
SOLON C. KEMON,
CHAS. A. PETTIT.